United States Patent [19]
Miles et al.

[11] Patent Number: 5,602,694
[45] Date of Patent: Feb. 11, 1997

[54] CAPSTANLESS HELICAL DRIVE SYSTEM

[75] Inventors: Robert J. Miles, Niwot; James Zweighaft, Boulder, both of Colo.

[73] Assignee: Exabyte Corporation, Boulder, Colo.

[21] Appl. No.: 527,702

[22] Filed: Sep. 13, 1995

Related U.S. Application Data

[63] Continuation of Ser. No. 150,730, Nov. 12, 1993, abandoned.

[51] Int. Cl.$^6$ .................................................. G11B 15/46
[52] U.S. Cl. .............................................. 360/84; 360/96.3
[58] Field of Search .............................. 360/84, 85, 96.1, 360/74.1, 74.2, 96.3

[56] References Cited

U.S. PATENT DOCUMENTS

| | | |
|---|---|---|
| 3,528,309 | 9/1970 | Laybourn . |
| 3,831,196 | 8/1974 | Thorpe ........................................ 360/52 |
| 4,125,881 | 11/1978 | Eige et al. ................................. 360/50 |
| 4,794,473 | 12/1988 | Kawasaki .................................. 360/70 |
| 4,835,628 | 5/1989 | Hinz et al. ................................. 360/48 |
| 4,843,495 | 6/1989 | Georgis et al. ...................... 560/77.15 |
| 4,875,635 | 10/1989 | Steltzer .............................. 242/67.3 R |
| 5,029,025 | 7/1991 | Wada ..................................... 360/96.1 |
| 5,065,261 | 11/1991 | Hughes et al. ............................ 360/70 |
| 5,068,757 | 11/1991 | Hughes et al. ....................... 360/77.13 |
| 5,142,422 | 8/1992 | Zook et al. ............................... 360/54 |
| 5,313,345 | 5/1994 | Schandl et al. ........................ 360/74.1 |

FOREIGN PATENT DOCUMENTS

| | | |
|---|---|---|
| 55-80844 | 6/1980 | Japan . |
| 1-170342 | 7/1989 | Japan . |
| 03219459 | 9/1991 | Japan . |

*Primary Examiner*—Robert S. Tupper
*Assistant Examiner*—William J. Klimowicz
*Attorney, Agent, or Firm*—Nixon & Vanderhye, P.C.

[57] ABSTRACT

A capstanless helical scan recording system (14) comprises a supply reel (24); a take-up reel (26); and a media transport path (20) extending from the supply reel to the take-up reel. A drum (30) is positioned along the media transport path and has a read head (R1,R2) and a write head (W1,W2) mounted thereon for recording and reading information in helical stripes on the media. The take-up reel comprises a rotor assembly (60), a rotating hub assembly (70), and a gearing system. The rotor assembly includes a sun gear (80) which rotates at a first rotational speed. The rotating hub assembly rotates carries three planetary gears (160) and imparts a velocity to media transported in the media transport path. The gearing system meshes with the rotor assembly and with the hub assembly for causing the hub assembly to have a greater rotational speed than the rotor assembly. The gearing system preferably has a gear ratio on the order of about 8:1. A tension arm (44) protrudes into the media transport path and decouples the supply reel to compensate for reel runout during high speed operation. The system has no further means other than the take-up reel and the supply reel for imparting impetus to the media along the media transport path.

12 Claims, 9 Drawing Sheets

CAPSTANLESS HELICAL DRIVE SYSTEM

This is a continuation of application Ser. No. 08/150,730, filed Nov. 12, 1993, now abandoned.

BACKGROUND

1. Field of Invention

This invention pertains to method and apparatus for recording information on storage media, and particularly to method and apparatus for transporting and reeling storage media in a helical scan recording system.

2. Related Art and Other Considerations

Numerous prior art patents and publications teach recording and reading of information stored in helical stripes (or "tracks") on magnetic tape. Examples of helical scan tape drives are shown, inter alia, in the following U.S. patents (all of which are incorporated herein by reference):

U.S. Pat. No. 4,835,628 to Hinz et al.
U.S. Pat. No. 4,843,495 to Georgis et al.
U.S. Pat. No. 5,065,261 to Hughes et al.
U.S. Pat. No. 5,068,757 to Hughes et al.
U.S. Pat. No. 5,142,422 to Zook et al.

In a helical scan arrangement, travelling magnetic tape is at least partially wrapped around a rotating drum so that heads (both write heads and read heads) positioned on the drum are contiguous to the drum as the drum is rotated. One or more write heads on the drum physically record data on the tape in a series of discrete stripes oriented at an angle with respect to the direction of tape travel. The data is formatted, prior to recording on the tape, to provide sufficient referencing information to enable later recovery during readout by one or more read heads.

In many prior art helical scan systems, a fixed-radius capstan is provided to control the linear motion to the tape as the tape travels past the drum. The capstan is driven by a dedicated capstan motor. In capstan systems, a tachometer is typically provided on the capstan to provide feedback information for ensuring constant linear velocity of the tape.

Other helical scan systems (known as "reel-to-reel") do not employ a capstan. Once example of a "reel-to-reel system is disclosed in U.S. Pat. No. 4,125,881 to Eige et al. (incorporated herein by reference). One reel of such a system is typically known as a "supply" reel, the other reel is typically called a "take-up" reel. The supply reel and take-up reels generally each have dedicated motors. Various one-half inch magnetic tape products (such as IBM model 3480) are reel-to-reel streamers with stationary heads or linear tracking.

Generally, prior art capstanless systems involved high speed and high tension operating conditions and a stationary head. Prior art capstanless systems accordingly are inapplicable to helical scan products such as those using 4 mm or 8 mm magnetic tape or other low speed drives generally.

SUMMARY

A capstanless helical scan recording system comprises a supply reel; a take-up reel; and a media transport path extending from the supply reel to the take-up reel. A drum is positioned along the media transport path and has a read head and a write head mounted thereon for recording and reading information in helical stripes on the media. The take-up reel comprises a rotor assembly, a rotating hub assembly, and a gearing system. The rotor assembly includes a sun gear which rotates at a first rotational speed. The rotating hub assembly rotates three planetary gears and imparts a velocity to media transported in the media transport path. The gearing system meshes with the rotor assembly and with the hub assembly for causing the hub assembly to have a greater rotational speed than the rotor assembly. The gearing system preferably has a gear ratio on the order of about 8:1. A tension arm (44) protrudes into the media transport path and decouples the supply reel to compensate for reel runnout during high speed operation. The system has no further means other than the take-up reel and the supply reel for imparting impetus to the media along the media transport path.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
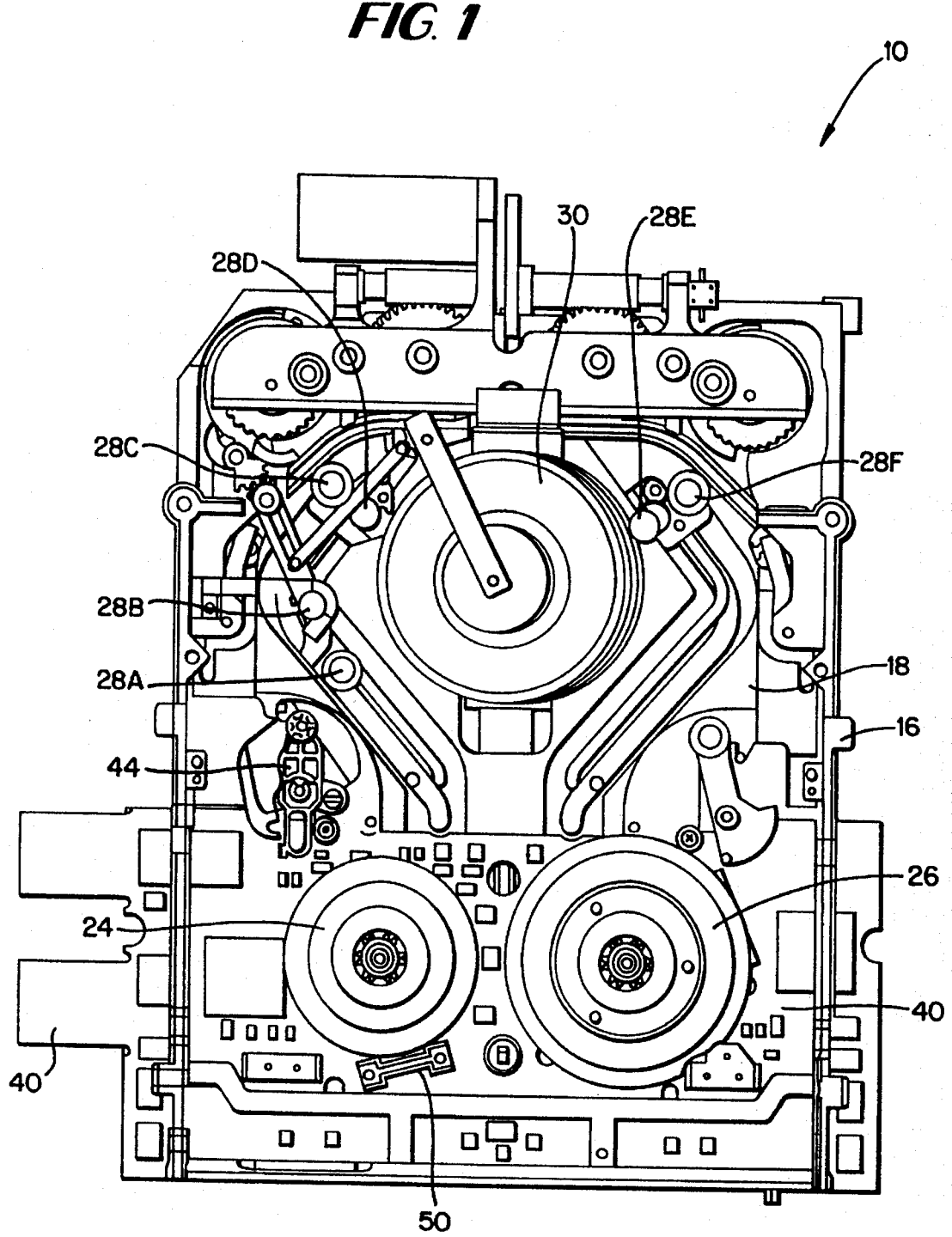
FIG. 1 is a top view of a capstanless helical scan recording system according to an embodiment of the invention.
Figure 2:
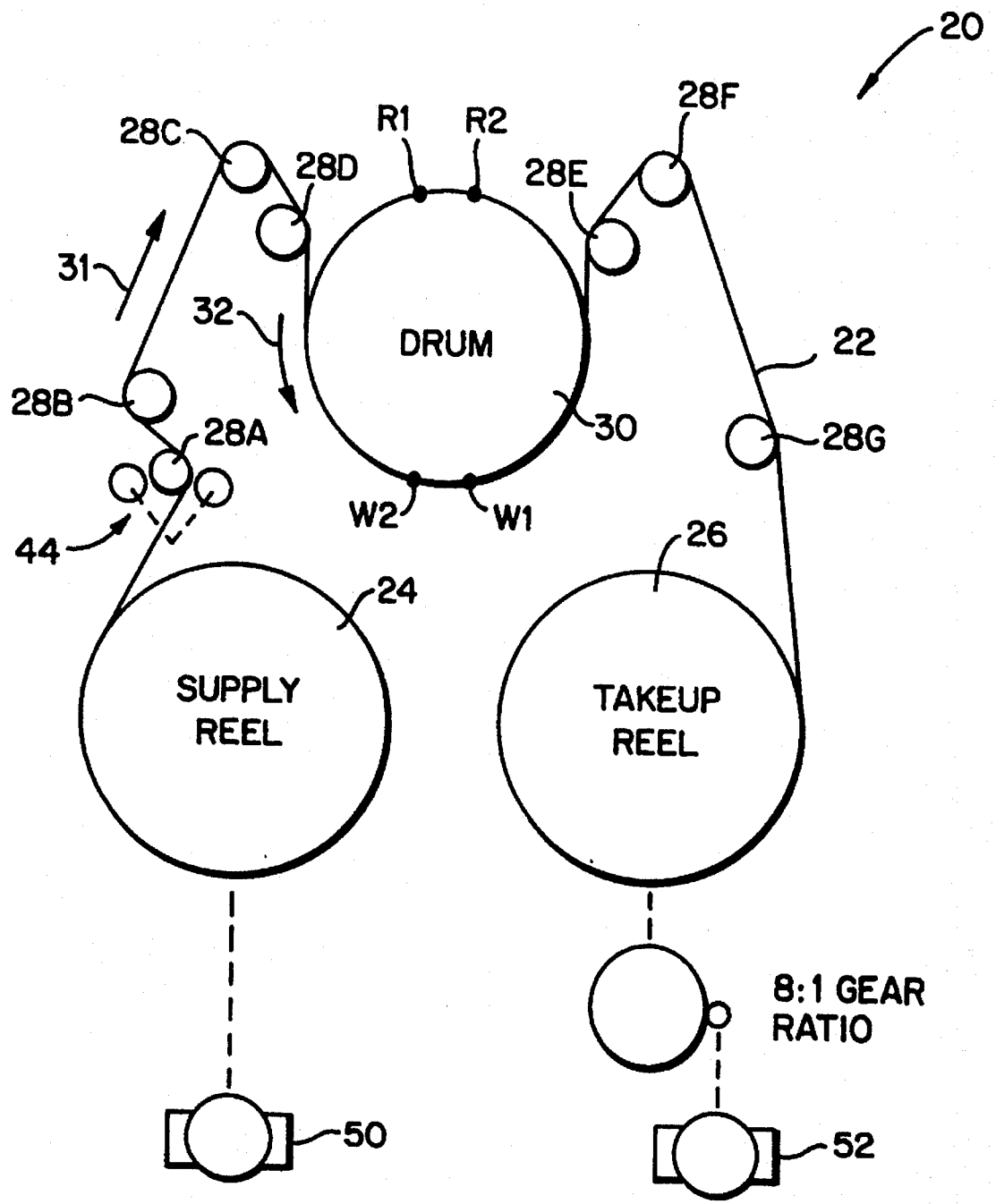
FIG. 2 is a schematic view of a path of media travel in the capstanless helical scan recording system of FIG. 1.

FIG. 1 shows a capstanless helical scan recording system or drive 14. Helical scan drive 14 includes a drive frame 16 and a deck floor 18. Drive frame 16 has a transverse dimension which extends in a direction parallel to the top and bottom edges of FIG. 1 and a depth dimension which extends in a direction parallel to the left and right edges of FIG. 1. FIG. 2 illustrates generally with reference numeral 20 a tape path for drive 14. In particular, FIG. 2 shows a magnetic tape 22 (such as an 8 mm magnetic tape, for example) having a first end wound around a supply reel 24 and a second end wound around a take-up reel 26. The path traversed by tape 22 is defined at least in part by a series of tape guides 28A–28G and a rotating scanner or drum 30. Tape guides 28 and drum 30 are ultimately mounted on deck floor 18. In all operations excepting a rewind operation, tape 22 travels from supply reel 24 to take-up reel 26 in the direction depicted by arrow 31. Centers of supply reel 24 and take-up reel 26 are aligned in the transverse dimension of frame 16. As shown in FIG. 2, supply reel 24 and take-up reel 26 are rotatably driven by motors 50 and 52, respectively.

Seven media guides 28A–28G are provided for contacting the media along the media transport path. A center of a first media guide 28A is closer to the center of the transverse dimension of frame 16 than is a center of a second media guide 28B. With respect to the depth dimension of frame 16, a center of a third media guide 28C is further from a center of drum 30 than is a center of a fourth media guide 28D. Likewise, with respect to the depth dimension, a center of a sixth media guide 28E is further from the center of drum 30 than is a center of a fifth media guide 28F.

As shown in FIG. 1 and FIG. 2, drum 30 has read heads R1 and R2 as well as write heads W1 and W2 mounted on the circumference thereof (the exact positioning of which will be described below). Drum 30 rotates in the direction depicted by arrow 32. In addition, drum 30 has a servo head S mounted circumferentially thereon. As drum 30 rotates, at any moment a portion of its circumference is in contact with travelling tape. During a recording or write operation, write heads W1 and W2 are periodically positioned to record "stripes" or "tracks" as heads W1 and W2 move in a direction of head travel across tape 22.

Details regarding the positioning of the heads W1, W2, R1, R2 and S, as well as the particular track recording scheme achieved by drum 30, are disclosed in simultaneously-filed U.S. patent application Ser. No. 08/150,726, of Georgis and Zweighaft entitled "Method And Apparatus For Controlling Media Linear Speed In A Helical Scan Recorder" (incorporated herein by reference).

Figure 4:
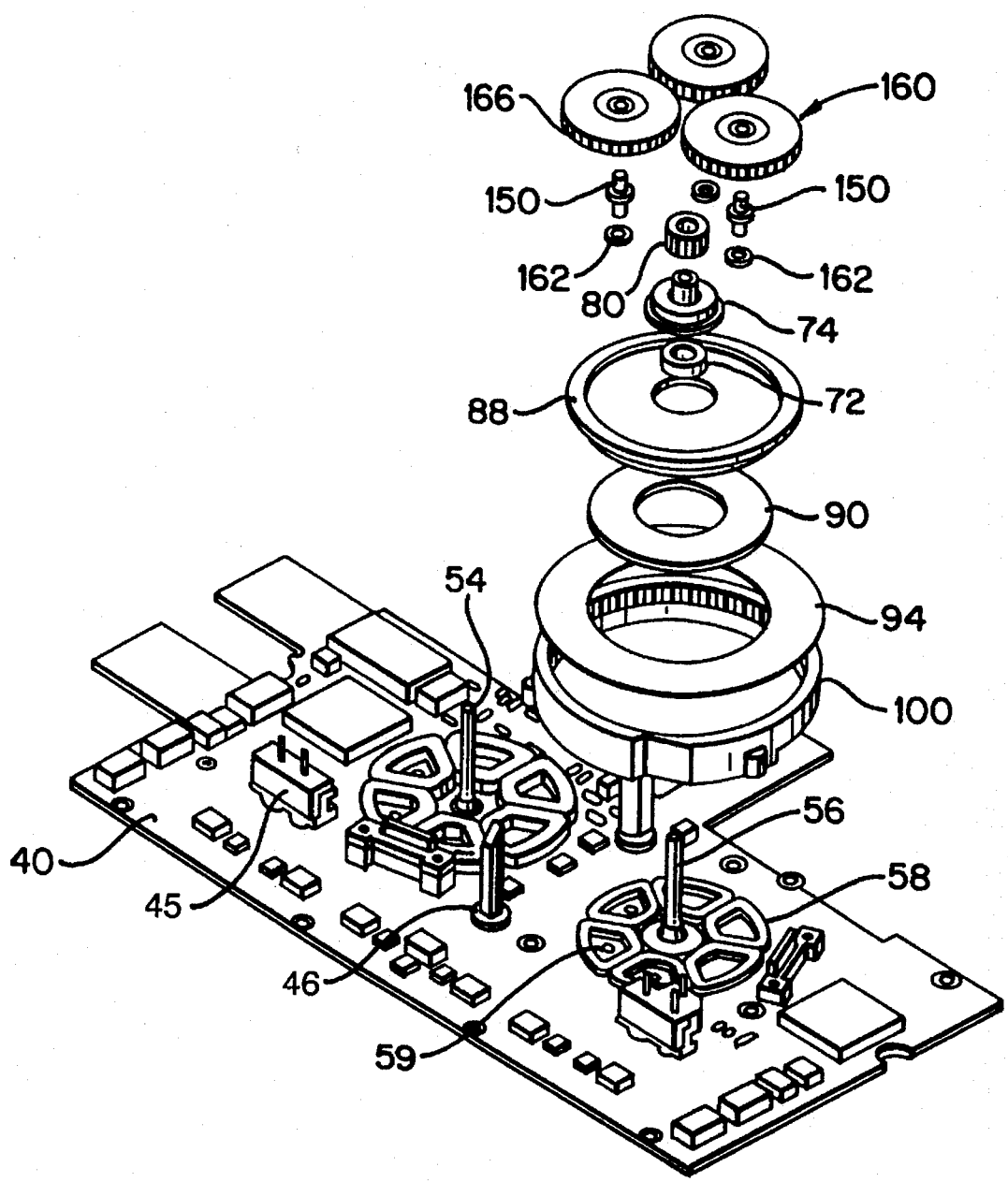
FIG. 4 is an exploded view of the take-up reel assembly of FIG. 3.

FIG. 1 also shows that deck floor 18 has a flexible circuit/return plate assembly 40 positioned thereon as well a tensioning arm 44. As shown in FIG. 4, flexible circuit/return plate assembly 40 has mounted thereon a high resolution quadrature encoder 45 and a brake release 46. In addition, assembly 40 has mounted thereon upstanding stationary shafts 54 and 56 for supply reel 24 and take-up reel 26, respectively. Shaft 56 has an shaft axis 57 which, as illustrated in a horizontally-lying drive 14, extends in a vertical direction (see FIG. 5 and FIG. 6).

Positioned in a circular pattern around each shaft 54,56 are six motor coils 58. Each motor coil has a Hall sensor 59 centrally positioned therein on assembly 40. Utilization of motor coils 58 and Hall sensors 59 are described in greater detail in simultaneously-filed U.S. Pat. No. 5,426,355 of James Zweighaft entitled "Power-Off Motor Deceleration Control System" as well as in simultaneously-filed U.S. patent application Ser. No. 08/150,731 of James Zweighaft et al. entitled "High Performance Power Amplifier", both of which are incorporated herein by reference.

Take-up reel 26 includes a geared take-up motor illustrated in FIG. 3–FIG. 7. Take-up reel 26 includes a rotor assembly 60 (illustrated in FIG. 6) and a planetary hub assembly 70 (illustrated in FIG. 5).

ROTOR ASSEMBLY

Figure 6:
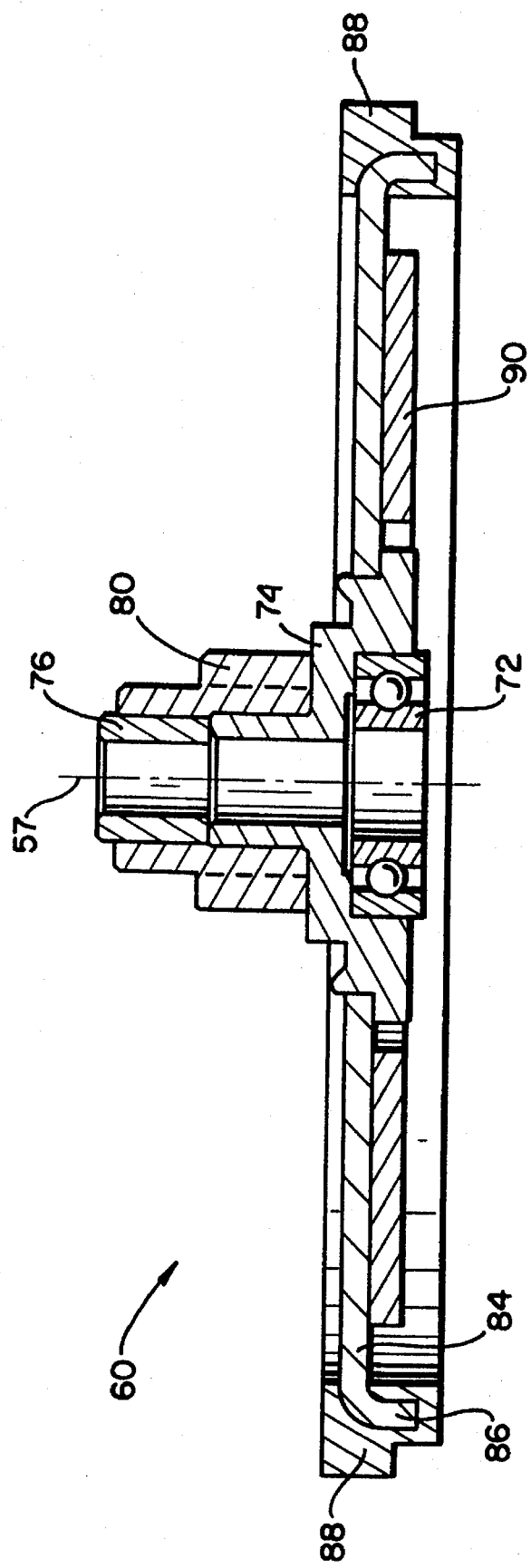
FIG. 6 is a side view, partially sectioned, of a rotor assembly portion of the take-up reel assembly FIG. 3.

As shown in FIG. 6, rotor assembly 60 has ball bearing 72, bearing/gear support housing 74, and insert molded bushing 76 for fitting over shaft 56. Concentrically positioned about a center spindle of bearing/gear support housing 74, and sitting on a highest horizontal shoulder thereof, is insert molded sun gear 80.

On a lower horizontal shoulder thereof, bearing/gear support bushing 74 carries a disk-shaped steel return plate 84. An outer peripheral edge 86 of return plate 84 is bent vertically and carries a tachometer ring 88. On its underside, between bushing 72 and tach ring 88, return plate has mounted thereon a disk-shaped magnet plate 90.

Figure 3:
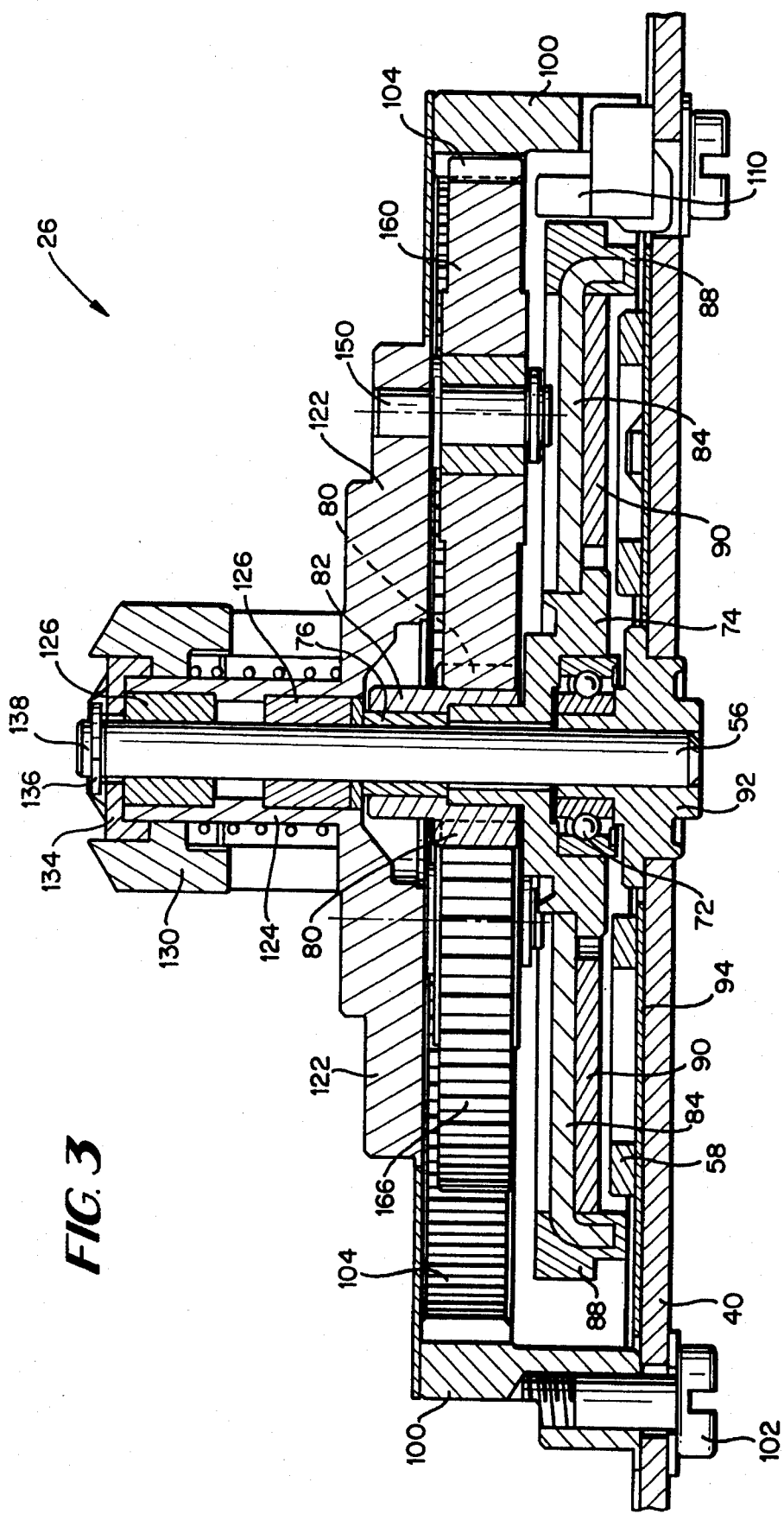
FIG. 3 is a side view, partially sectioned, of a take-up reel assembly of the capstanless helical scan recording system of FIG. 1.

FIG. 3 shows how rotor assembly 60 is mounted on flexible circuit/return plate assembly 40. In particular, shaft 56 is supported on plate assembly 40 by an annular anchor 92. Near its base, anchor 92 has an annular seal 94 extending therearound (see also FIG. 4), upon which coils 58 are mounted. At its top, anchor 92 carries ball bearing 72.

Figure 7:
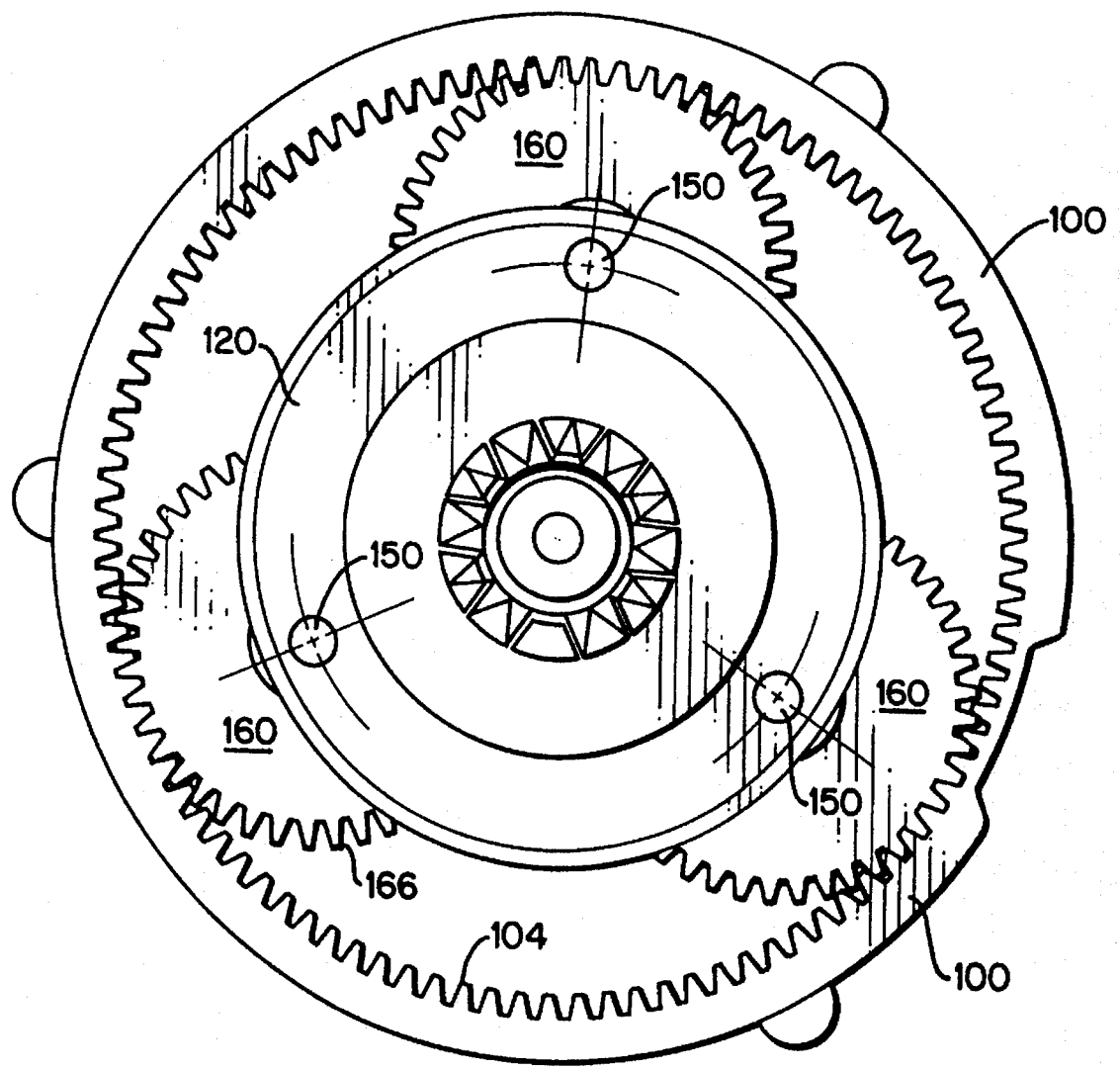
FIG. 7 is a top view of the take-up reel assembly FIG. 3.

As also shown in FIG. 3, flexible circuit/return plate assembly 40 also carries, at the outer periphery of seal 94, a stationary internal gear 100. Internal gear 100 has the shape of a ring, and is mounted on plate assembly 40 by three pins or fasteners 102. As shown in FIG. 3 and FIG. 7, on its upper, interior peripheral surface internal gear 100 has teeth 104.

Flexible circuit/return plate assembly 40 also has mounted thereon a tachometer 110 (see FIG. 3). Tachometer 110 is positioned intermediate plate assembly 40 and internal gear 100 at a selected point on the circumference of take-up reel 26. Tachometer 110 is thus positioned to interface with tachometer ring 88 for providing signals relative to the rotational speed of rotor assembly 60.

From the foregoing discussion, it should be understood that the entire rotor assembly 60 rotates in unison as selected coils 58 are energized for affecting magnet plate 90. The ensuing discussion treats planetary hub assembly 70, the components of which also rotate in unison with one another but at a different speed from rotor assembly 60 in view of a gearing arrangement about-to-be-described.

PLANETARY HUB ASSEMBLY

Planetary hub assembly 70 (shown isolated in FIG. 5) includes an annular retaining plate 120. Retaining plate 120 has a radially extending plate flange 122 as well as a cylindrical, vertically (i.e., axially) extending spindle 124. Retaining plate 120 is provided with a central interior aperture which two bushings 126 mounted therein. Bushings 126 permit retaining plate 120 to rotate about shaft 56.

Figure 5:
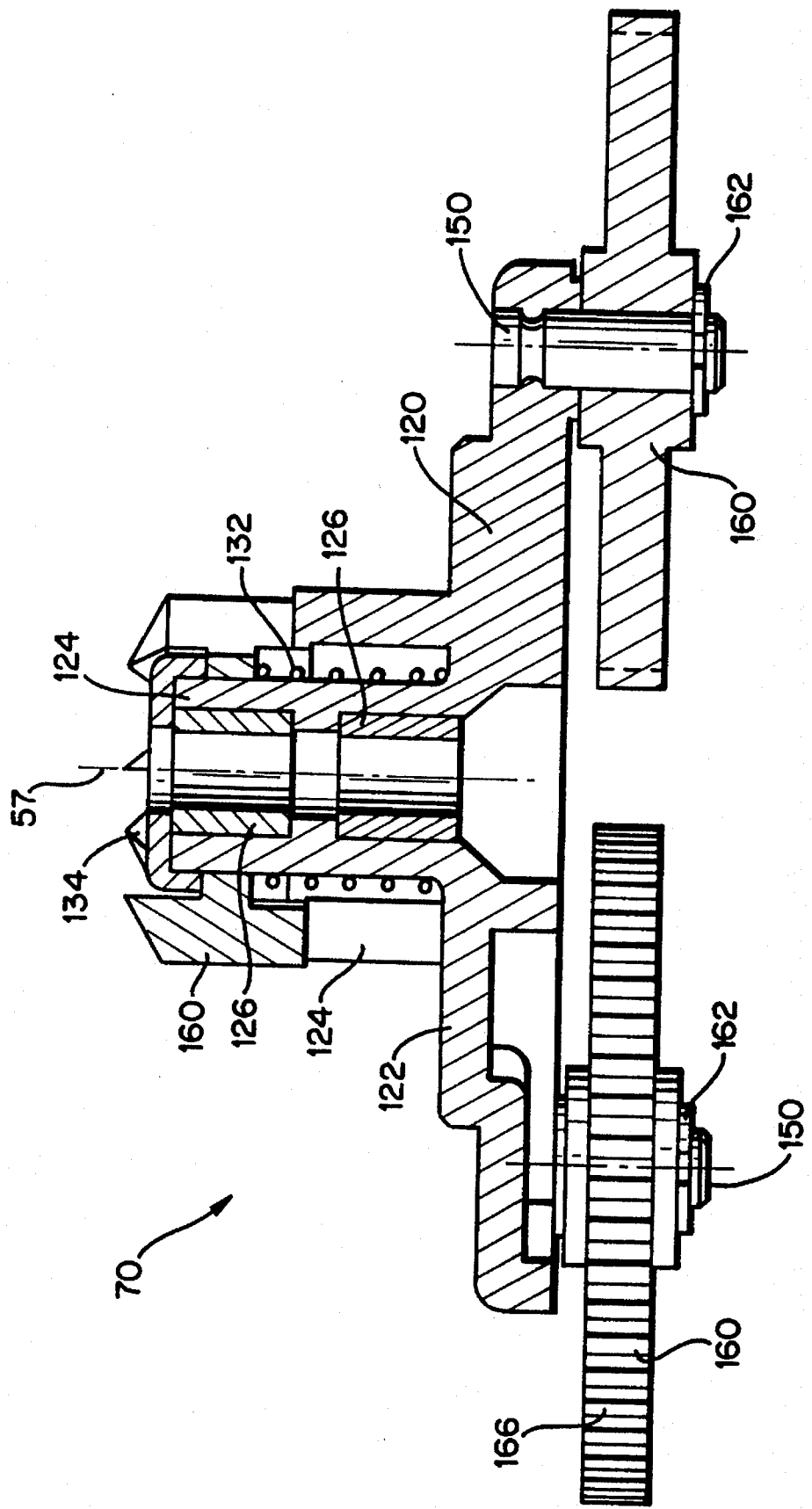
FIG. 5 is a side view, partially sectioned, of a planetary gear assembly portion of the take-up reel assembly FIG. 3.

Spindle 124 is axially slotted as illustrated in FIG. 4. A hub ring 130 is axially positioned atop spindle 124 and concentrically mounted thereabout. Hub ring 130 is also axially slotted. As shown in FIG. 5, a helical spring 132 is concentrically positioned about the outer periphery of spindle 124. A first end of spring 132 rests on plate flange 122; a second end of spring 132 abuts an internal radial flange on hub ring 130. An annular hub cap 134 has a lower surface thereof abutting spindle 124. A retaining washer 136 is mounted to the top of shaft 56 by fastener 138.

Intermediate spindle 124 of retaining plate 120 and an outer peripheral edge of plate 120 are provided three apertures, equally angularly spaced about shaft 56. Each aperture is sized to received a respective gear support pin 150. Gear support pins 150 depend parallel to axis 57 below a lower surface of retaining plate 120. At a distal end of each gear support pin 150 is a respective planetary gear 160 centrally mounted and retained thereon by retaining washer 162. Each planetary gear 160 has gear teeth 166 provided on its outer periphery.

GEARING SYSTEM

The gearing system of take-up reel 26 thus includes sun gear 80 (of the rotor assembly 60); the three planetary gears 160 (of the planetary hub assembly 70); and the stationary internal gear 100.

Table 1 shows the number of gear teeth provided on each gear of the illustrated embodiment. Table 2 shows gear ratios for gears included in the gearing system of the illustrated embodiment.

TABLE 1

| Gear | Number of Teeth |
| --- | --- |
| Sun gear | 14 |
| Planet Gear | 42 |
| Internal Gear | 100 |

TABLE 2

| Mesh | Ratio |
| --- | --- |
| Sun/Planet | 3 |
| Sun/Internal | 7.14 |
| Planet/Internal | 2.38 |
| Overall (Sun/Internal + 1) | 8.14 |

Thus, in the illustrated embodiment, as rotor assembly 60 carrying sun gear 80 rotates, planetary hub assembly 70 rotates about shaft 56 on the order of ⅛ the speed of rotor assembly 60.

TENSIONING ARM

Figure 8A:
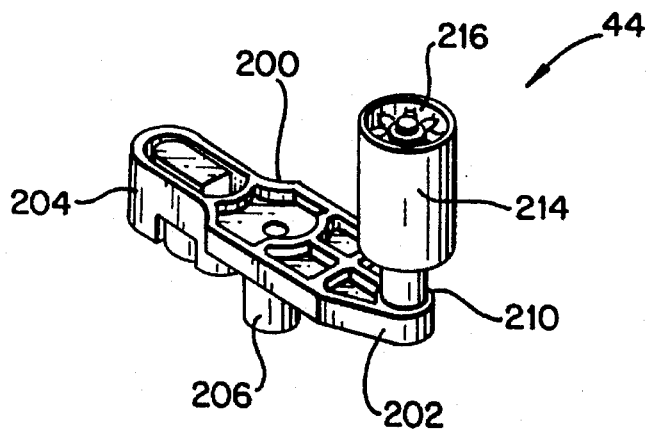
FIG. 8A is an isometric view of a tensioning arm of the capstanless helical scan recording system of FIG. 1.
Figure 8B:
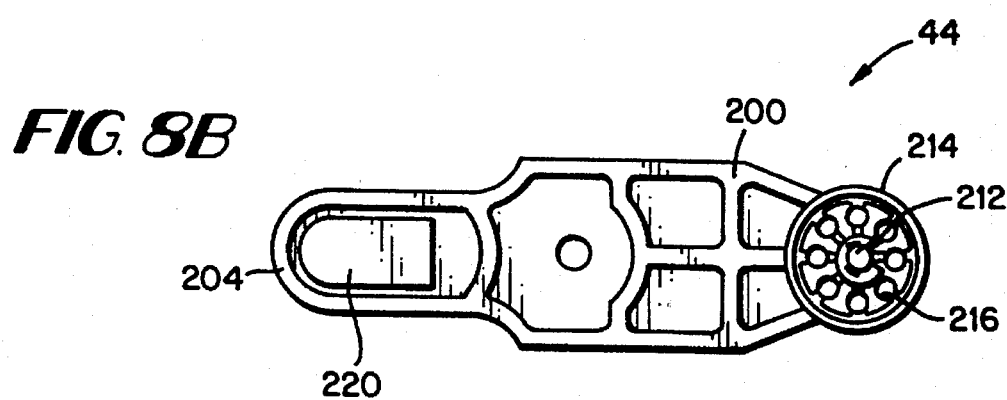
FIG. 8B is a top view of the tensioning arm of FIG. 8A.
Figure 8C:
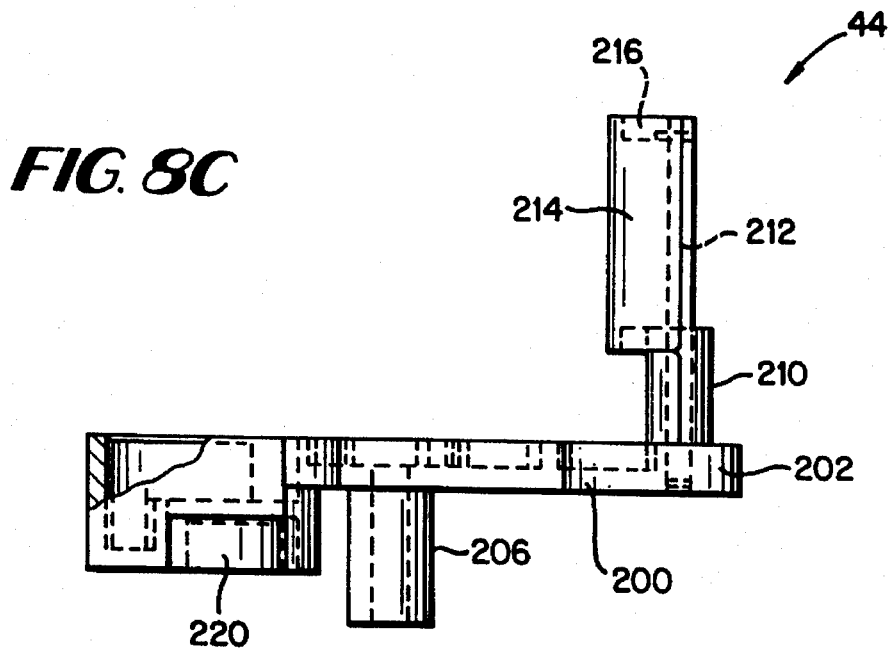
FIG. 8C is a side view, partially section and partially broken, of the tensioning arm of FIG. 8A.

FIG. 8A–FIG. 8C show tensioning arm 44, also known as a "swingarm". The tension arm 44 is positioned along the media path between the supply reel 24 and the first tape guide 28A on the media path. Tensioning arm 44 includes a ribbed horizontal frame member 200. Tensioning arm frame member 200 has a roller end 202 and a tail end 204. Approximately mid-way between ends 202 and 204 a bushing collar 206 depends from an underside of frame member 200. Bushing collar 206 centrally accommodates an unillustrated mounting shaft which extends vertically upward from deck floor 18. By virtue of bushing collar 206, tensioning arm 44 pivots as necessary about the unillustrated mounting shaft.

At its roller end 202, frame member 200 carries a cylindrical spindle mount 210, which in turn centrally carries a vertically up-standing spindle 212. Rotatably mounted about spindle 212 is a roller 214. Roller 214 is axially retained on spindle 212 by a retaining washer 216. The outer circumferential surface of roller 214 selectively forms part of tape path 20 as necessary.

At its tail end 204, frame member 200 carries a magnet assembly 220 on its underside. A counterweight 224 is also provided to counter the presence of roller 214 at the roller end 202. Deck floor 18 is provided with an unillustrated sensor beneath magnet 220 for detecting the position of tensioning arm 44, and thus tension in tape 22.

A range of tensioning arm 44 positions are shown in broken lines in FIG. 2. Tensioning arm 44 is normally spring-biased into the tape transport path 20.

OPERATION

Figure 9:
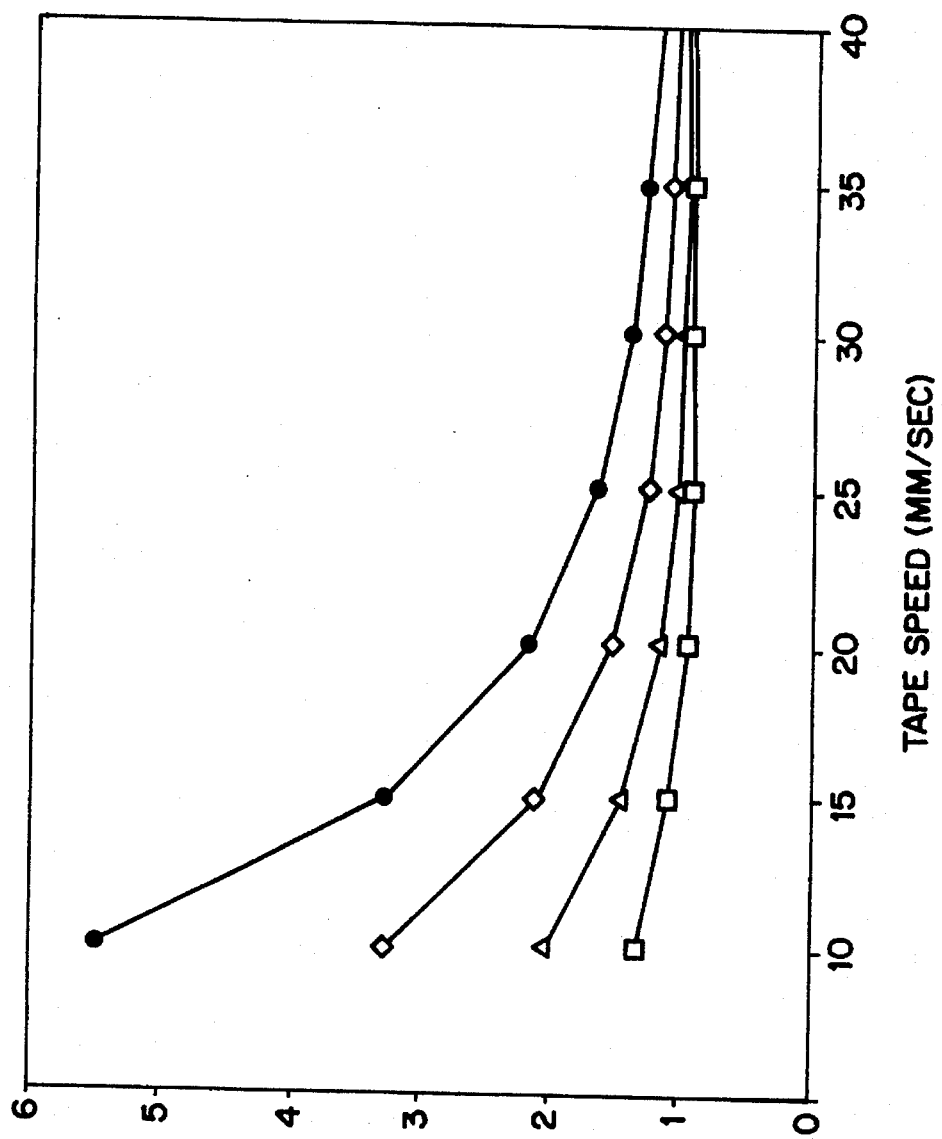
FIG. 9 is a graph showing tape speed variation verses tape speed for various torque ripple levels.

Take-up reel 26 as described above provides the necessary low torque ripple (less than 1%) for achieving low speed velocity control of tape 22 in drive 14. FIG. 9 is a graph showing tape speed variation verses tape speed for various torque ripple levels for drive 14 (assuming the supply reel motor to be held constant at 5%).

Drive 14 utilizes various features in order to obtain enhanced performance. These features include the above-described gearing of take-up reel 26; the usage of quality gears; reduced torque ripple; decoupling of supply reel 24 using tensioning arm 44; and the particular write tracking technique disclosed in simultaneously-filed U.S. patent application Ser. No. 08/150,726 of Georgis and Zweighaft entitled "Method And Apparatus For Controlling Media Linear Speed In A Helical Scan Recorder" (incorporated herein by reference).

Thus, the drive 14 of the present invention offers tape speed control without the use of a capstan by using a precision highly geared take-up reel motor, an in-path speed detection system, and a tension control system. Elimination of a capstan entails elimination of a capstan motor and related components (e.g., bearings, encoder, and associated electronics). Accordingly, problems of capstan alignment are not encountered (e.g., problems of tape edge damage, embedding of particles, distortion of thin media, etc.).

Nor does drive 14 require a conventional pinch roller and its related components, as well as pinch roller alignment issues (including pinch roller misalignment and attendant tape damage). Thus, drive 14 achieves a fewer part count with fewer moving parts, and thus enhanced reliability, less cost, and less tape path space.

By gearing take-up reel 26 with the above-described gearing arrangement, numerous benefits are realized. The approximately 8:1 gear ratio allows take-up reel 26 to stay above 80 RPM with a full reel of tape, thereby keeping the motor away from stick/slip problems (which are typical of capstan motors) in rotating mechanisms at slow speed.

Advantageously, in drive 14 speed variation is reduced due to an increase in takeup motor angular momentum. Due to the gearing, the speed and therefore the angular momentum of the rotor assembly 60 is increased (a flywheel effect).

Speed variation is reduced due to a significant increase in reflected inertia of the take-up reel 26 due to the 8:1 gear ratio. The reflected inertia is the square of the gear ratio and therefore tape (22) sees an inertia of 64 times the actual rotor inertia. This desensitizes the takeup system from outside disturbances.

Speed variation is reduced due to an increase in the torque ripple smoothing. By gearing and therefore running the rotor at higher speeds, the torque ripple frequency increases. This allows the takeup motor/gear system to essentially filter the torque ripple and reduce its effect on speed variation.

Speed variation is reduced due to an increase in sample rate for one feedback loop in the reel to reel speed control system. By gearing the takeup system 8:1, the rotor spins 8 times faster than the tape reel, and since the tach ring is attached to the rotor, the system sees 8 times more tachometer samples than without gearing. This allows for an increase in frequency response in the servo system, and also increased sample averaging which reduces tach jitter effects.

The planetary gear system design has numerous features to minimize speed variation and noise. For example, a very high quality (low runout) plastic sun gear (80) which is insert molded to the rotor of the takeup motor-gear system. Also provide are very high quality plastic planet gears (160), as well as a high quality support plate (122) for the planet gears (160) which has insert molded bearings and insert molded shafts (for the planet gears). Using the insert molding process tolerances which contribute to speed variation and noise are minimized. Further, drive 14 has a high quality metal internal gear (100) which minimizes 1x runout and adds stiffness to the system.

Drive 14 features a high quality takeup motor design which uses a special magnetization pattern for the rotor magnet which significantly reduces motor torque ripple resulting in greatly reduced speed variation.

Tensioning arm 44 located next to supply reel (24) provides numerous advantages, including the following: (1) isolation of the supply reel (24) from the tape path (20); (2) isolation of supply reel torque ripple, and torque drag variation which would otherwise adversely effect speed and tension control; (3) isolation of supply side (low tension) tape slip; (4) isolation of the supply side system mass from the tape path (20) which minimizes tension variation which would otherwise effect speed control; (5) isolation of supply side runout; and, (6) replacement of tape stretching (tension transients) with swing arm motion.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

We claim:

1. A helical scan recording system which records information on storage media, the system comprising:
   a supply reel;
   a supply reel motor;
   a take-up reel;
   a take-up reel motor;
   a media transport path extending from the supply reel to the take-up reel;
   a drum positioned along the media transport path and upon which a read head and a write head are mounted for recording and reading information in helical stripes on the media;
   wherein the take-up reel comprises:
      a rotor assembly comprising a sun gear which rotates at a first rotational speed imparted by the take-up reel motor;
      a rotating hub assembly comprising a planetary gear assembly which meshes with the sun gear and which rotates at a second rotational speed to impart a velocity to media transported in the media transport path; and
      a non-rotatable internal gear which meshes with the planetary gear assembly to provide an overall fixed gear ratio between the sun gear and the non-rotatable internal gear and whereby the second rotational speed is less than the first rotational speed.

2. The system of claim 1, wherein the overall gear ratio is on the order of about 8:1.

3. The system of claim 1, further comprising a tension arm which protrudes into the media transport path for selectively decoupling the supply reel from the take-up reel.

4. The system of claim 3, wherein the tension arm is positioned along the path between the supply reel and a first guide on the path.

5. The system of claim 1, wherein the system has no further means other than the take-up reel and the supply reel for imparting impetus to the media along the media transport path.

6. The system of claim 1, wherein the system is a capstanless system, and wherein the only mechanical coupling of the supply reel and the take-up reel for causing rotation of either the supply reel or the take-up reel is by the media.

7. A helical scan recording system which records information on storage media, the system comprising:
   a supply reel;
   a supply reel motor;
   a take-up reel;
   a take-up reel motor;
   a media transport path extending from the supply reel to the take-up reel, the supply reel being coupled to the take-up reel only by media extending therebetween along the media transport path;
   a drum positioned along the media transport path and upon which a read head and a write head are mounted for recording and reading information in helical stripes oil the media;
   a plurality of media guides for contacting the media along the path;
   a tension arm positioned along the media path between the supply reel and a first media guide on the path to selectively decouple the supply reel from the path;
   wherein the take-up reel comprises:
      a rotor assembly comprising a sun gear which rotates at a first rotational speed imparted by the take-up reel motor;
      a rotating hub assembly comprising a planetary gear assembly which meshes with the sun gear and which rotates at a second rotational speed to impart a velocity to media transported in the media transport path; and
      a non-rotatable internal gear which meshes with the planetary gear assembly to provide an overall fixed gear ratio between the sun gear and the non-rotatable internal gear and whereby the second rotational speed is less than the first rotational speed, the overall gear ratio being on the order of about 8:1.

8. A helical scan drive which records information on magnetic tape, the drive comprising:
   a drive supply reel;
   a supply reel motor;
   a drive take-up reel;
   a take-up reel motor;
   a tape transport path extending from the drive supply reel to the drive take-up reel;
   a drum positioned along the tape media transport path and upon which a read head and a write head are mounted for recording and reading information in helical stripes on the tape;
   wherein the drive take-up reel comprises:
      a take-up reel shaft which is stationary;
      a rotor assembly comprising a sun gear which rotates about the take-up reel shaft at a first rotational speed imparted by the take-up reel motor;
      a rotating hub assembly which engages a tape reel, the rotating hub assembly comprising:
         a retaining plate, the retaining plate being rotatable about and concentrically mounted about the take-up reel shaft, the retaining plate having mounted thereto a planetary gear assembly which meshes with the sun gear whereby the rotating retaining plate rotates at a second rotational speed to impart a velocity to the tape transported in the tape transport path, the retaining plate further having a spindle;
         a hub ring concentrically mounted about the spindle of the retaining plate and secured to the take-up reel shaft; and a helical spring concentrically mounted about the spindle and having a first end in contact with retaining plate and a second end in contact with the hub ring; and a non-rotatable internal gear which meshes with the planetary gear assembly to provide an overall fixed gear ratio between the sun gear and the non-rotatable internal gear and whereby the second rotational speed is less than the first rotational speed.

9. The drive of claim 8, wherein the overall gear ratio is on the order of about 8:1.

10. The drive of claim 8, further comprising a tension arm which protrudes into the tape transport path for selectively decoupling the supply reel from the take-up reel.

11. The drive of claim 8, wherein the drive is a capstanless drive and has no further means other than the take-up reel and the supply reel for imparting impetus to the tape along the tape transport path.

12. The drive of claim 11, wherein the tension arm is positioned along the path between the supply reel and a first guide on the path.

* * * * *